Sept. 11, 1934.                L. W. ATCHISON                1,973,518
                             REFRIGERATOR CABINET
                              Filed Feb. 1, 1933
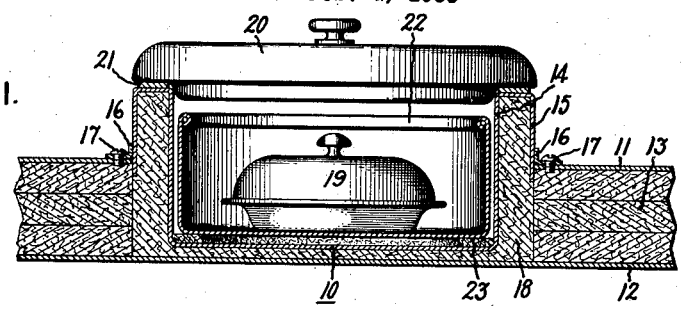
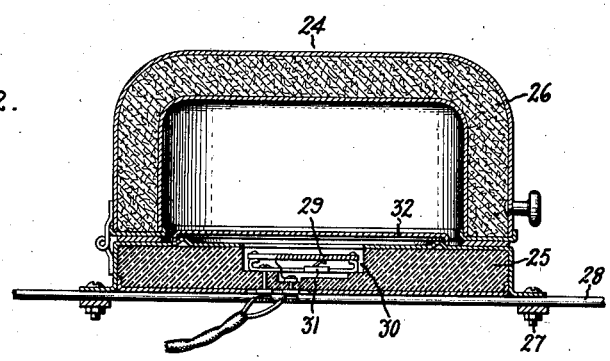
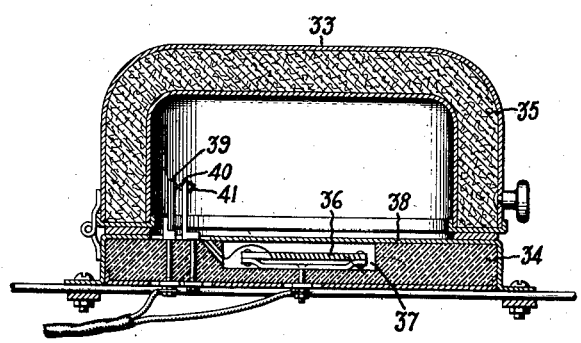
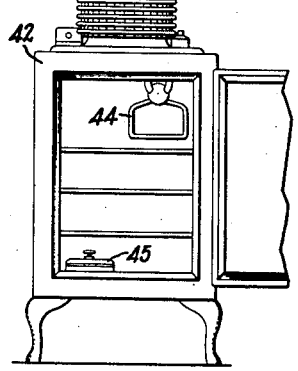
Inventor:
Leonard W. Atchison,
by Charles V. Tullar
        His Attorney.

Patented Sept. 11, 1934

1,973,518

UNITED STATES PATENT OFFICE 1,973,518

REFRIGERATOR CABINET

Leonard W. Atchison, Schenectady, N. Y., assignor to General Electric Company, a corporation of New York Application February 1, 1933, Serial No. 654,625

6 Claims. (Cl. 62—89)

My invention relates to refrigerator cabinets, and more particularly to compartments used within refrigerator cabinets for the purpose of maintaining food, such as butter and the like, at a temperature higher than that within the main portion of the cabinet.

In order that food stuffs may be properly preserved it is necessary to maintain the cabinets in domestic refrigerators at a temperature much lower than that at which butter spreads easily. When butter is kept in the refrigerator cabinet it is necessary that it be warmed up before it is in condition for serving at the table. Accordingly, it is an object of my invention to provide an auxiliary thermally insulated compartment arranged within the refrigerated compartment of a refrigerator cabinet and maintained at a temperature at which butter and similar foods stored in the auxiliary compartment are sufficiently soft for spreading.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 shows a thermally insulated compartment arranged within the walls of the refrigerated compartment of a refrigerator cabinet and to which heat is transferred from the outside of the cabinet; Fig. 2 shows a similar thermally insulated compartment arranged on a shelf within a refrigerator cabinet and which is heated electrically; Fig. 3 shows a compartment similar to that shown in Fig. 2 provided with a thermostat for regulating the temperature within the compartment; and Fig. 4 shows a household refrigerator provided with a compartment of the construction shown in Fig. 1.

Referring to the drawing, in Fig. 1 I have shown a thermally insulated auxiliary compartment 10 formed within the insulated walls of a refrigerator, the walls of the cabinet forming a refrigerated compartment having inner and outer spaced metal shells 11 and 12 provided with insulation 13 therebetween. The auxiliary compartment 10 comprises a metallic cup-shaped receptacle 14 provided with a downturned flange 15 which is spaced from the side walls of the receptacle 14 and is provided with a flanged ring 16 attached to the downturned flange 15 and secured to the inner shell 11 of the refrigerator cabinet by screws 17. The compartment 10 is surrounded by insulation 18 arranged between the walls of the cup-shaped receptacle and the walls of the refrigerator cabinet. The bottom wall of the auxiliary compartment is arranged close to the outer shell, so that the transfer of heat from the outer wall of the cabinet into the auxiliary compartment maintains the temperature in the compartment within a range intermediate the temperature within the cabinet and the outside air, which is suitable for the preservation of butter or other similar foods contained in a covered dish 19. A heat insulated lid 20 is provided for the compartment 10, a cylindrical packing ring 21 being arranged between the lid and the top of the receptacle.

A cup 22 is arranged within the receptacle 14 and is spaced from the bottom of the auxiliary compartment by a heat insulating ring 23. In the summer time when the temperature outside the cabinet is high the leakage of heat into the compartment may be such as to raise the temperature above that which is desired. By providing the cup 22 and the insulating ring 23, the leakage of heat into the cup will be decreased, so that the temperature in the cup will be within the desired range. On the other hand, when the temperature of the air outside of the cabinet is lower, as in the winter time, it may be desirable to remove the cup 22 and place the articles directly on the bottom of the receptacle 14, so that the conduction of heat from the exterior of the cabinet into the compartment will be sufficient to maintain the compartment within the desired range of temperature.

In the operation of the modification of my invention shown in Fig. 1 heat will be transmitted from the outside of the cabinet through the comparatively thin bottom wall of the auxiliary compartment 10. The walls of the auxiliary compartment are insulated to a degree such that the temperature within the compartment will be sufficient to maintain butter at a proper temperature for spreading and yet to preserve the butter for a reasonable length of time.

In Fig. 2 I have shown a modification of my invention which comprises a thermally insulated compartment in the form of a container 24 including an insulated base 25 and an insulated hinged lid 26. This container is arranged to be secured within the refrigerated compartment of a refrigerator by bolting it at 27 to a wire shelf 28. Heat is supplied to the container by a variable electrical resistor 29 arranged in a recess 30 in the bottom of the container. The variable resistor can be adjusted by moving a slide 31. A plate 32 is arranged to cover the bottom of the container and the recess 30, the plate being removable to afford access to the slide 31. Sufficient heat is supplied by the resistor 29 to maintain the butter or other food within the container 24 at a suitable temperature above that of the refrigerated compartment.

The modification of my invention shown in Fig. 3 is similar to that shown in Fig. 2, except that a thermostat is provided to maintain a predetermined constant temperature within the container within a range above the temperature inside of the refrigerated compartment and below that of the air outside of the refrigerator, which will be suitable for the preservation of butter or other similar foods. This container 33 includes an insulating base 34 and an insulated cover 35 which is hinged to the base. The container is heated to the temperature desired for preserving butter or the like by an electrical resistor 36 arranged in a recess 37 below a top plate 38 of the base. The electrical resistor is connected in series with a thermostat comprising a bi-metallic strip 39 and a stationary contact 40, which is provided with an adjusting screw 41 for adjusting the temperature to be maintained in the container. In the use of this container in a refrigerator cabinet the temperature is maintained substantially constant by the action of the thermostat and does not, therefore, vary in accordance with the variation of temperature within the refrigerator cabinet.

In Fig. 4 I have shown a household refrigerator comprising a cabinet 42 provided with a compressor and condenser unit 43 mounted on the top thereof, and an evaporator 44 having a freezing compartment and arranged to cool the interior of the refrigerator cabinet. On the bottom wall of the cabinet a compartment 45, of the construction shown in Fig. 1, is provided for the preservation of butter or other similar foods, which may be maintained at the desired temperature above that within the refrigerated compartment and below the room temperature.

It is apparent from the foregoing that I have provided a simple construction for the preservation of butter and other foods at a desired temperature while at the same time preventing undesirable hardening of the foods.

Although I have shown particular embodiments of my invention, I desire it to be understood that my invention is not limited to the constructions set forth, and I intend, therefore, in the appended claims to cover all modifications which do not depart from the spirit and scope of my invention.

What I claim as new and desire to secure by Letters Patent of the United States, is,—

1. A refrigerator cabinet including a refrigerated compartment, a thermally insulated compartment within said refrigerated compartment, and means for maintaining the temperature in said thermally insulated compartment above the temperature within said refrigerated compartment and within a temperature range suitable for preserving butter and the like.

2. A refrigerator cabinet having spaced inner and outer walls and including a refrigerated compartment, thermal insulation between said walls, a thermally insulated compartment formed within said refrigerated compartment partially within said walls, and means for maintaining the temperature within said thermally insulated compartment higher than that within said refrigerated compartment.

3. A refrigerator cabinet having spaced inner and outer walls and including a refrigerated compartment, thermal insulation between said walls, means including a thermally insulated compartment within said refrigerated compartment and set within said walls for maintaining articles at a higher temperature than that within said refrigerated compartment, said thermally insulated compartment having one wall providing materially less insulation between said thermally insulated compartment and the outside of said cabinet than between the walls of said refrigerated compartment.

4. A refrigerator cabinet including a refrigerated compartment, a thermally insulated compartment arranged within said refrigerated compartment, and means for heating said thermally insulated compartment and for maintaining said thermally insulated compartment at a temperature higher than that within said refrigerated compartment.

5. A refrigerator cabinet including a refrigerated compartment, a thermally insulated compartment arranged within said refrigerated compartment, and means including an electrical heating element for heating said thermally insulated compartment and for maintaining said thermally insulated compartment at a temperature higher than that within said refrigerated compartment.

6. A refrigerator cabinet including a refrigerated compartment, a thermally insulated compartment arranged within said refrigerated compartment, means including an electrical heating element for heating said thermally insulated compartment, and thermostatic means for controlling said heating element and for maintaining said thermally insulated compartment at a predetermined temperature higher than that within said refrigerated compartment.

LEONARD W. ATCHISON.